(12) United States Patent
Black

(10) Patent No.: US 7,690,991 B2
(45) Date of Patent: Apr. 6, 2010

(54) BETTING EXCHANGE SYSTEM

(75) Inventor: Andrew Wilson Black, London (GB)

(73) Assignee: The Sporting Exchange Ltd., London (GB)

( * ) Notice: Subject to any disclaimer, the term of this patent is extended or adjusted under 35 U.S.C. 154(b) by 697 days.

(21) Appl. No.: 09/959,975

(22) PCT Filed: Mar. 15, 2001

(86) PCT No.: PCT/GB01/01141

§ 371 (c)(1),
(2), (4) Date: Jan. 16, 2002

(87) PCT Pub. No.: WO01/77861

PCT Pub. Date: Oct. 18, 2001

(65) Prior Publication Data

US 2003/0096651 A1 May 22, 2003

(30) Foreign Application Priority Data

Apr. 6, 2000 (GB) .................................. 0008530.8

(51) Int. Cl.
*A63F 13/12* (2006.01)
*G06Q 30/00* (2006.01)
*G06Q 50/00* (2006.01)

(52) U.S. Cl. .............................. 463/26; 463/25; 463/40; 463/42; 705/37

(58) Field of Classification Search .................. 463/1, 463/11–25, 26, 27, 28, 29, 40–42; 700/91–93; 705/37

See application file for complete search history.

(56) References Cited

U.S. PATENT DOCUMENTS

| 3,593,303 | A | * | 7/1971 | Streets ......................... 463/25 |
| 3,645,531 | A | * | 2/1972 | Wright ......................... 463/17 |
| 4,412,287 | A | * | 10/1983 | Braddock, III ............... 705/37 |
| 4,903,201 | A | | 2/1990 | Wagner ...................... 364/408 |
| 5,077,665 | A | | 12/1991 | Silverman et al. ........... 364/408 |

(Continued)

FOREIGN PATENT DOCUMENTS

AU    199965355    7/2000

(Continued)

OTHER PUBLICATIONS

UK patent application search report, GB 2 356 071 A, application 0008530.8, Black, published May 9, 2001.*

(Continued)

*Primary Examiner*—Peter DungBa Vo
*Assistant Examiner*—Matthew D. Hoel
(74) *Attorney, Agent, or Firm*—Staas & Halsey LLP

(57) ABSTRACT

A betting exchange system receiving a plurality of bet requests backing a given outcome, each backing bet request specifying a price and a size at which an originator of the request is prepared to bet that the given outcome will occur. The betting exchange system receiving a plurality of bet requests laying the given outcome, each laying bet request specifying a price and a size at which an originator of the request is prepared to bet that the given outcome will not occur. The betting exchange system aggregating backing bet requests specifying the same price, aggregating laying bet requests specifying the same price, automatically matching a received backing bet request with individual or aggregated laying bet requests to complete a betting transaction, and automatically matching a received laying bet request with individual or aggregated backing bet requests to complete a betting transaction.

35 Claims, 10 Drawing Sheets

U.S. PATENT DOCUMENTS

| | | | | |
|---|---|---|---|---|
| 5,136,501 | A | * | 8/1992 | Silverman et al. ............. 705/37 |
| 5,542,671 | A | * | 8/1996 | Stewart ....................... 273/146 |
| 5,573,244 | A | * | 11/1996 | Mindes ......................... 463/26 |
| 5,573,248 | A | * | 11/1996 | Parra et al. .................. 273/274 |
| 5,620,182 | A | * | 4/1997 | Rossides .................. 273/138.2 |
| 5,672,106 | A | * | 9/1997 | Orford et al. ................. 463/28 |
| 5,713,793 | A | * | 2/1998 | Holte ........................... 463/25 |
| 5,785,596 | A | * | 7/1998 | Hobert ......................... 463/22 |
| 5,828,843 | A | * | 10/1998 | Grimm et al. ............... 709/228 |
| 5,830,069 | A | * | 11/1998 | Soltesz et al. ................. 463/42 |
| 5,832,462 | A | | 11/1998 | Midorikawa et al. .......... 705/35 |
| 5,836,816 | A | * | 11/1998 | Bruin et al. ................... 463/16 |
| 5,842,921 | A | * | 12/1998 | Mindes et al. ................. 463/16 |
| 5,894,556 | A | * | 4/1999 | Grimm et al. ............... 709/227 |
| 5,924,082 | A | * | 7/1999 | Silverman et al. ............. 705/37 |
| 5,924,083 | A | * | 7/1999 | Silverman et al. ............. 705/37 |
| 5,963,923 | A | | 10/1999 | Garber ......................... 705/37 |
| 5,970,479 | A | | 10/1999 | Shepherd ..................... 705/37 |
| 6,033,308 | A | * | 3/2000 | Orford et al. ................. 463/28 |
| 6,104,815 | A | * | 8/2000 | Alcorn et al. ............... 380/251 |
| 6,135,881 | A | * | 10/2000 | Abbott et al. ................... 463/3 |
| 6,287,199 | B1 | * | 9/2001 | McKeown et al. ............ 463/40 |
| 6,358,150 | B1 | * | 3/2002 | Mir et al. ...................... 463/28 |
| 6,361,437 | B1 | * | 3/2002 | Walker et al. ................. 463/23 |
| 6,508,710 | B1 | * | 1/2003 | Paravia et al. ................. 463/42 |
| 6,674,448 | B1 | * | 1/2004 | Garahi et al. ............... 345/719 |
| 6,712,701 | B1 | * | 3/2004 | Boylan et al. ................. 463/42 |
| 6,773,347 | B1 | * | 8/2004 | Marshall et al. ............... 463/25 |
| 7,020,632 | B1 | | 3/2006 | Kohls et al. |
| 2004/0248637 | A1 | * | 12/2004 | Liebenberg et al. ........... 463/16 |
| 2005/0197948 | A1 | * | 9/2005 | Davie et al. ................... 705/37 |

FOREIGN PATENT DOCUMENTS

| | | |
|---|---|---|
| AU | 200056633 | 1/2001 |
| AU | 2004100599 A4 * | 9/2004 |
| FR | 2 693 120 | 1/1994 |
| FR | 2 753 909 | 4/1998 |
| GB | 2 180 675 A * | 4/1987 |
| GB | 2 356 071 A * | 5/2001 |
| KR | 2000-0012242 | 3/2000 |
| RU | 99/36846 | 7/1999 |
| WO | WO 95/23383 | 8/1995 |
| WO | WO 97/15362 A1 * | 10/1996 |
| WO | WO 97/15362 * | 5/1997 |
| WO | WO 97/22072 * | 6/1997 |
| WO | WO 98/04991 | 2/1998 |
| WO | WO 98/04991 A1 * | 2/1998 |
| WO | WO 98/26361 | 6/1998 |
| WO | WO 99/34887 | 7/1999 |

OTHER PUBLICATIONS

"Trading Trend or Range?", www.investopedia.com, downloaded Dec. 18, 2005.*
"What is Arbitrage?", economics.about.com, downloaded Dec. 18, 2005.*
"Sportsbook Arbitrage," www.homepokergames.com, downloaded Dec. 18, 2005.*
"Sports Betting Arbitrage," www.uk-wholesaler.co.uk, downloaded Dec. 18, 2005.*
"Arbitrage Sports Betting and Trading Services," www.ucantlose.co.uk, downloaded Dec. 18, 2005.*
H.R. 4411, "Internet Gambling Prohibition and Enforcement Act," downloaded from www.govtrack.us/data/us/bills.txt/109/h/h4411.pdf, Oct. 8, 2006.*
1961 Wire Act, downloaded from uscode.house.gov/download/pls/18C50.txt, Oct. 8, 2006.*
Priority document for British patent application 0008530.8, downloaded from www.wipo.int, Oct. 8, 2006.*
EPO search results from v3.espacenet.com, Oct. 6, 2006.*
Wikipedia articles for "Arbitrage," "Arbitrage Betting," "Bet Exchange," "Bookmaker," "Call Option," "Derivative (Finance)," "Hedge Fund," "Matched Betting," "Option," "Put (Option)," "Short (Finance)," and "Spread Betting," downloaded from www.wikipedia.org, Oct. 6, 2006.*
"Scarne's Complete Guide to Gambling," by John Scarne, 1961, Simon and Schuster, New York, chapters on bookmaking.*
"Scarne's Complete Guide to Gambling," by John Scarne, 1961, Simon & Schuster, New York, N.Y., definition of laying a bet, pp. 683 and 684.*
"Scarne's Complete Guide to Gambling," by John Scarne, 1961, Simon & Schuster, New York, N.Y., chapter on craps.*
www.betex.com/home.html, printout dated Mar. 30, 2005.
www.betex.com/aboutus/article.htm, printout dated Mar. 30, 2005.
www.betex.com/aboutus/about.htm, printout dated Mar. 30. 2005.
www.betex.com/how.html, printout dated Mar. 30, 2005.
Tom Anderson, "New Person-to-Person Betting Site for 'Flutterers'", http://www.netimperative.com/2000/03/28/New_persontoperson, printout dated Mar. 30, 2005.
Robin Hanson, "Idea Future, How Making Wagers on the Future Can Make it Happen Faster", WIRED, Sep. 1995.
www.wsex.com, printout dated Apr. 28, 2005.
www.wsex.com/main.html, printout dated Apr. 28, 2005.
www.wsex.com/about/wse_rules.html, printout dated Apr. 28, 2005.
www.wsex.com/menu/interactive.html, printout dated Apr. 28, 2005.
www.wsex.com/about/sport_futures.html, printout dated Apr. 28, 2005.
www.wsex.com/about/limit_order.html, printout dated Apr. 28, 2005.
www.wsex.com/about/faq.html, printout dated Apr. 28, 2005.
Rebecca Quick, "Entrepreneurs Roll The Dice on a New Site", The Wall Street Journal, Thursday, Apr. 10, 1997.
Steven Crist, "All Bets Are Off", Sports Illustrated, Jan. 26, 1998.
English translation of Notice of Preliminary Rejection, issued Mar. 20, 2007, in Korean application 10-2002-7013468.
"Racing: Betfair Collects Award", by Patrick Weaver, The Express, Apr. 22, 2003.
"They're Off With a Legal Seal of Approval", Mail on Sunday, Jan. 26, 2003.
"Turning the Tables—Bookies on Offensive As Business is Squeezed in Gambling Revolution", Daily Mail, Sep. 3, 2002.
"Revolution—and the Bells Toll for Thee, Mr. Bookmaker", Racing Post, Jul. 24, 2002.
Printout from www.queensawards.org.uk, downloaded Aug. 7, 2007, "The Queen's Award for Enterprise: Innovation 2003".
"Racing: Punters at Odds with Each Other: An Online Betting Revolution Could Spell The End for Traditional Ways of Gambling", The Observer, Jan. 13, 2002.
"Odds on Chance of Coming Out on Top", The Herald (Glasgow), Jan. 28, 2002.
"Online Newcomer Ups the Pace in the Bookmaking Stakes", Evening Standard, Jun. 16, 2003.
"Betting Exchanges Oust the Bookies", Investment Briefing, Jun. 20, 2003.
Robert Forsythe, et al., "Anatomy of an Experimental Political Stock Market," The American Economic Review, vol. 82, No. 5, (Dec. 1992), pp. 1142-1161.
Evidence in Support Opposition to Patent Application: 785337: Attachment 6—E-Mail from Professor Nelson D. Forrest.
Colin Cameron, "You Bet The Beffair Story: How Two Men Changed the World of Gambling", 308 pages, HarperCollins Publishers. Copyright 2008.
Declaration of Robert Bowman.
2nd Declaration of Robert Bowman.
Declaration of Simon Davis.
2nd Declaration of Simon Davis.
3rd Declaration of Simon Davis.
Declaration of Allen McArthur.
Declaration of Simon Gapes.
Declaration of John Francome.
Declaration of Gregory John Conroy.
Declaration of Gerard Chandrahasen.
Declaration of Kathleen Mary Jones.

Notice of Opposition.
Amended Notice of Opposition.
Interim Statement of Case.
Statement of Case.
Counterstatement.

Amended Statement of Case.
Second Amended Notice of Opposition.
Amended Counterstatement.

* cited by examiner

BETTING EXCHANGE SYSTEM

This application is a National Stage 35 USC Section 371 of international application PCT/GB01/01141, filed Mar. 15, 2001, and which claims foreign priority to UK application 0008530.8, filed Apr. 6, 2000.

FIELD OF THE INVENTION

This invention relates to the field of betting, particularly but not exclusively to sports betting conducted over the Internet.

BACKGROUND

A number of companies provide Internet based betting services. The majority of these are simply an extension of conventional betting services, offering fixed odds betting in which customers only have access to one side of the market, i.e. they can only efficiently back, or "buy", a particular outcome to occur at odds set by the bookmaker. However, it is often far easier to decide what is not going to occur rather than trying to decide what will occur. In this situation, though, customers are not able to place a bet to support their view. While it is true that they can try to simulate laying, i.e. "selling" the outcome by backing all other possible outcomes, this is highly unlikely to be profitable due to the overround charged by the bookmaker. The overround is the extent to which the bookmaker's total book exceeds 100% and represents the bookmaker's primary source of profit. In the UK, a typical overround is 10-15%.

SUMMARY OF THE INVENTION

According to the present invention, there is provided a betting exchange system comprising server means configured to receive bet requests from a plurality of users over a communications network, each of said requests comprising a bet backing an outcome or laying an outcome, wherein the server means is operable to match respective bets which back and lay a given outcome. Allowing a user access to both sides of a betting transaction, by specifying whether he wishes to back or lay an outcome, provides the user with additional flexibility, and can facilitate a liquid two-way market. In addition, it can ensure the most efficient, and hence competitive, prices.

The bet requests can include a price at which the bet is to be placed, which can promote price competition and improve the efficiency of the market. If a better price is available to the user, the system can match the bet at the better price.

The server means can further comprise means for automatically generating an implied bet in respect of an outcome for which no bet requests have been received. This can generate arbitrage opportunities and so allow bets to be filled automatically by the system even though there may be more explicit interest in one side of the market than the other.

According to the invention, there is further provided a method of operating a server configuration to provide a betting exchange system, comprising receiving bet requests from a plurality of users over a communications network, each of said requests comprising a bet backing an outcome or laying an outcome, and matching respective bets which back and lay a given outcome.

According to the invention, there is also provided a computer program configured to provide a betting exchange system on a server machine, said program implementing the steps of receiving bet requests from a plurality of users via a communications network, each of said requests comprising a bet backing an outcome or laying an outcome, and matching respective bets which back and lay a given outcome.

BRIEF DESCRIPTION OF THE DRAWINGS

Embodiments of the invention will now be described by way of example with reference to the accompanying drawings, in which.

DETAILED DESCRIPTION

Figure 1:
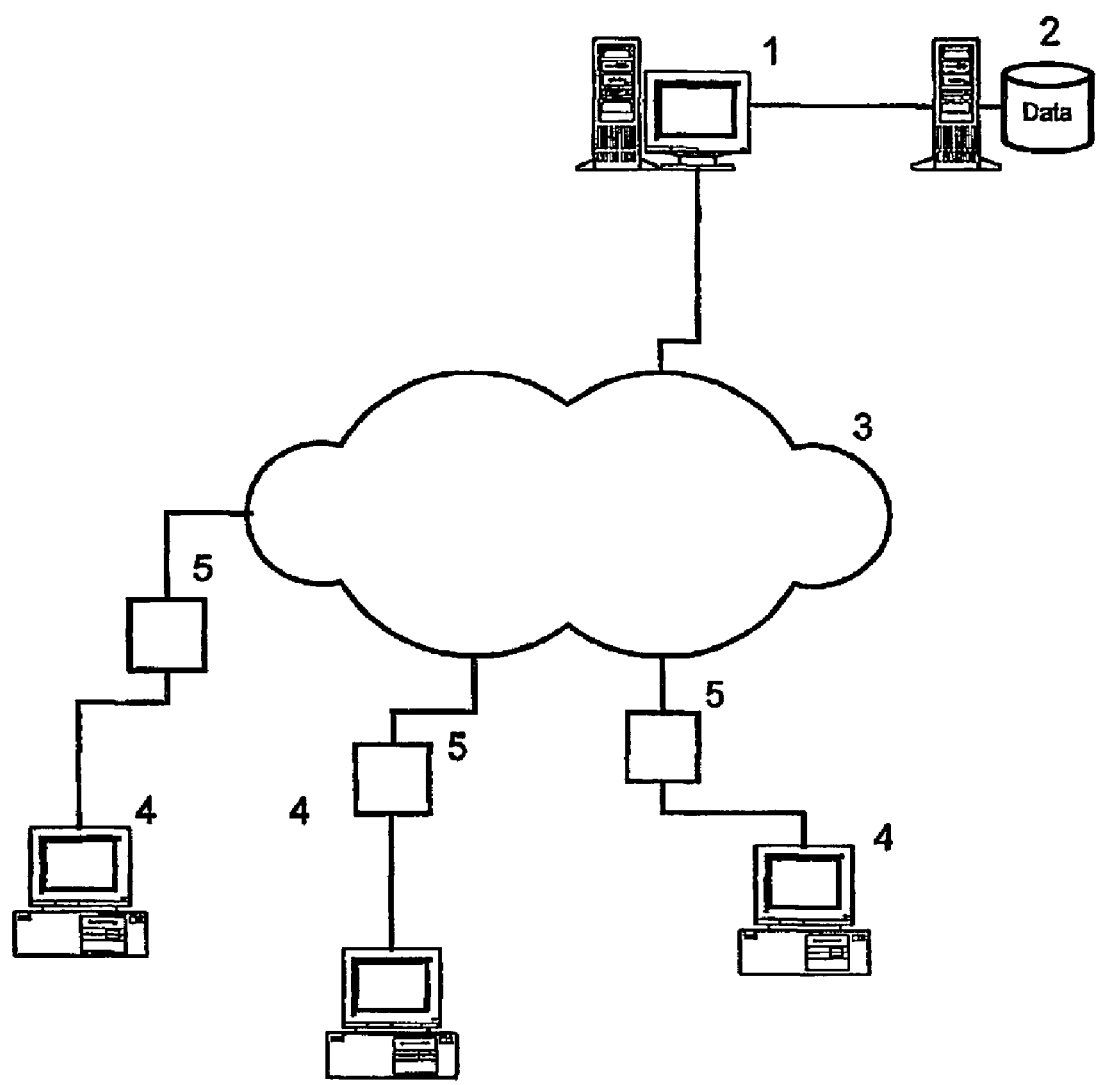
FIG. 1 is a schematic diagram showing a betting system according to the invention.

Referring to FIG. 1, a betting exchange system according to the invention is implemented on a server 1, for example a server machine running Windows NT™, connected to a back office database system 2, for example an Oracle or SQL relational database server. The database server 2 includes database storage for a comprehensive sports statistics service to be provided in conjunction with a betting service. The server 1 is connected to the Internet 3. The server is accessed over the Internet 3 by a plurality of client machines 4, for example personal computers running web browser software such as Microsoft Internet Explorer™ or Netscape Navigator™ and using dial-up connections through respective Internet Service Providers 5. Access to the server 1 is restricted by, for example, a firewall and other known secured measures. Other access methods are also envisaged, for example use of WAP (Wireless Application Protocol) phones to access a betting service running on a WAP server.

The server 1 includes a web server, for example the Microsoft IIS™ web server, to support web pages.

Figure 3:
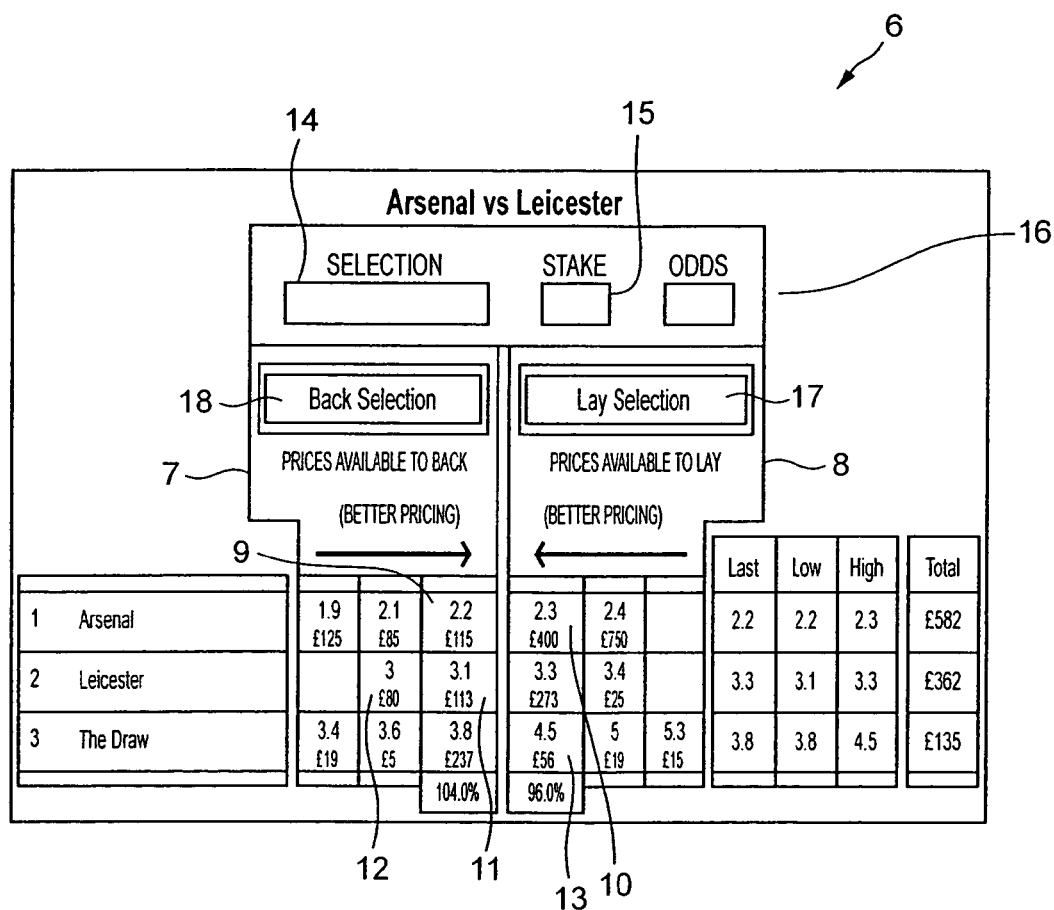
FIG. 3 is a screen shot showing a pricing screen illustrating an example of betting on a football match.
Figure 11:
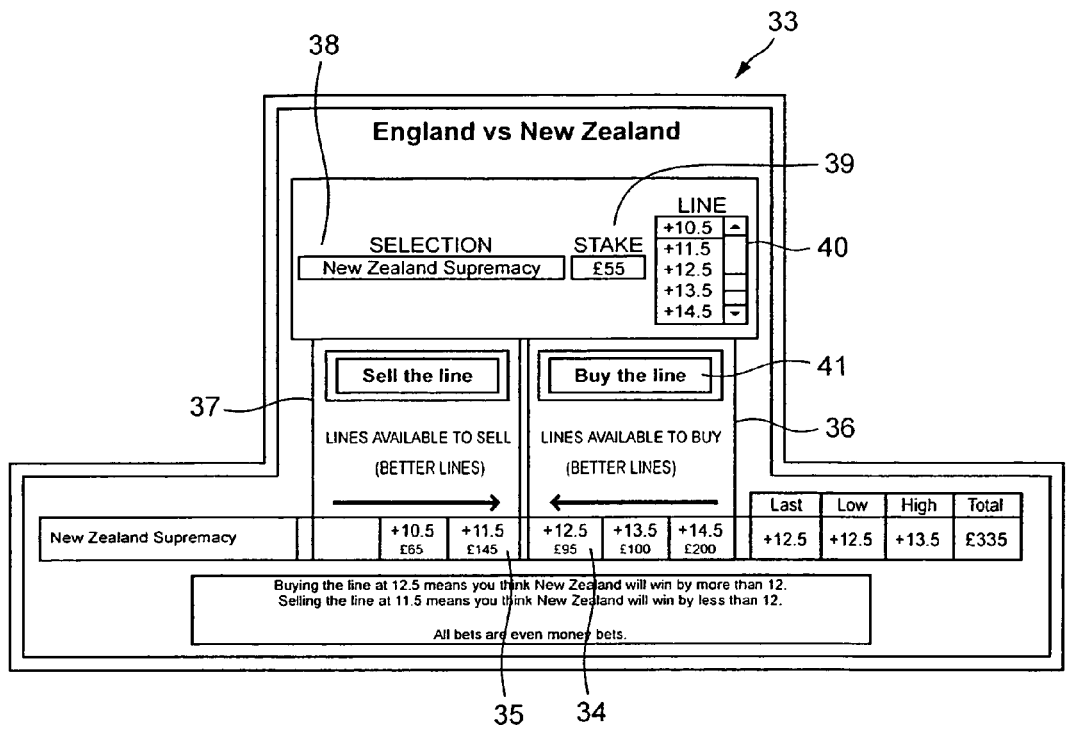
FIG. 11 is a screen shot showing a pricing screen which illustrates line betting.

The betting exchange system is implemented in software and betting is permitted through pricing screens displayed on a web page, as shown for example in FIG. 3 for fixed odds betting and FIG. 11 for line betting. The operation of the betting exchange system is explained in detail below for different betting types.

Figure 2:
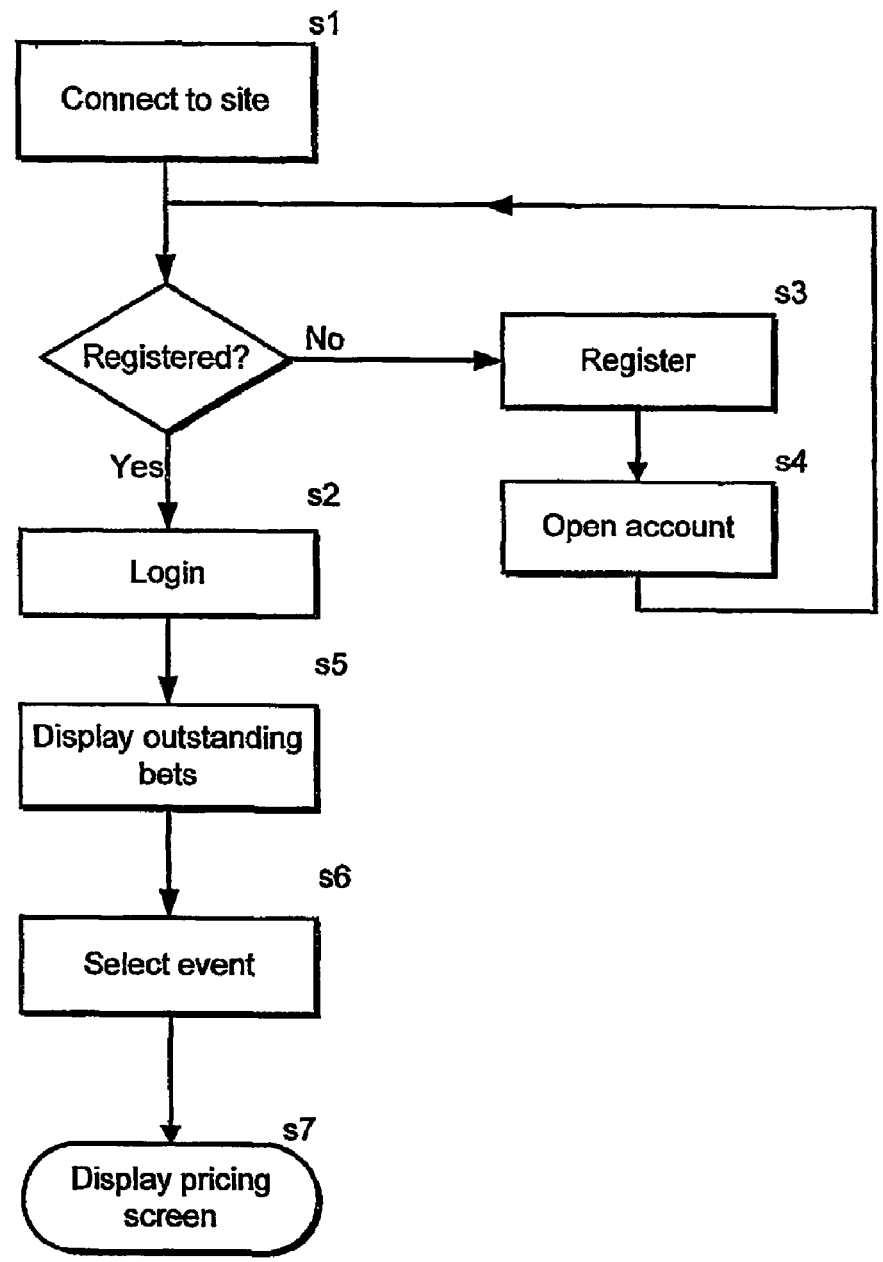
FIG. 2 is a flow diagram showing the steps required to access the betting service provided by the betting system of FIG. 1.

Referring to FIG. 2, a customer wishing to use the betting service provided by the betting exchange system accesses the website using his usual Internet access mechanism (step s1), and if he or she has previously registered, logs-in (step s2). If the customer has not previously registered, he goes through the registration procedure (step s3). Registered users have full access to all areas of the site. Only registered users can place bets on the exchange, subject to ensuring that there is sufficient credit in their account. Guest access to the site is also provided, but guests are not allowed to place bets on real events, although they are given full "read only" access to the site's statistics screens and betting screens. This allows them to follow the market closely. In addition, they are given access to a real time betting game that demonstrates how the betting exchange system works. As long as a user is not using the site on a registered basis, there is a button continuously visible that will take the user to the registration screen.

The registration procedure involves fill in a personal details form on the website's registration page, including an e-mail address, a user name and a password as well as the currency in which the customer would like his account to be managed. At the same time, an account is opened for the customer (step s4). Money can be deposited into the account via an Internet secure cash payment system, by telegraphic transfer or by telephone. Once the account has been opened, the customer is sent an e-mail containing an authentication code. The first time that the user logs in with their username and password they are required to enter the authentication code, to validate the e-mail address given in the registration process. When the user logs in subsequently he does not need to re-enter the authentication code.

The website provides each customer with detailed information about his betting activity. For example, a customer can quickly pull up a list of all his bets which are outstanding, both those that have been filled and those which are pending, the meaning of which is explained in detail below. This list can be sorted by event, by size of bet and by type of bet. A customer can also obtain a complete historical list of all bets placed and the outcome of each bet (i.e. win or lose). Furthermore, the customer can analyse his betting history in a number of ways, for example over any time period and for individual sports. All historical bets can be sorted by sport, by size, by type and by success/failure.

The betting exchange system also produces a comprehensive statement of account. This will show details of all transactions that impact the customer's account (e.g. deposits, withdrawals, bets and so on) and will provide a full reconciliation showing how current balances have been achieved.

Customers can tailor the website to meet their own requirements. They can decide what level of confirmation they require when placing bets, choose how the betting information appears on the screen, for example, view more than one market on a screen at any one time or create individually customised own composite pages, and select how graphically intensive the various screens are.

Once the customer has logged on, the system displays the status of any outstanding bets from a previous session, the outcome of which has not yet been confirmed by the customer (step s5). The customer then chooses the event on which he or she wishes to bet from a list published on the website (step s6). The selection triggers the display of a pricing screen for the event (step s7). The different types of bet a customer can engage in are described in detail below.

Fixed Odds Betting

The betting exchange system according to the invention permits customers to lay events as well as to back them. When backing an outcome, the customer bets that the outcome will occur and makes a profit when that happens. If the outcome does not occur, then the customer loses his original stake. Conversely, when laying an outcome, the customer receives stake money and, if the outcome does not occur, keeps this stake money, thus making a profit. If the outcome does occur then the customer loses the stake money multiplied by the odds at which he accepted the stake. The operation of the system is illustrated by the example of a soccer match between Arsenal and Leicester.

There are three possible outcomes: Arsenal win, Leicester win or the game ends in a draw. The assumed odds on the three possible outcomes are as follows:

| | |
|---|---|
| Arsenal to win | 5 to 4 |
| Leicester to win | 2 to 1 |
| Draw | 7 to 2 |

By way of example, it is assumed that the following people bet on the match:

Alex backs Arsenal with a £100 bet, i.e. he bets that Arsenal will win

Belinda lays Arsenal for £100, i.e. she bets that Leicester will win or that the match will be drawn Charlotte backs Leicester with a £75 bet, i.e. she bets that Leicester will win David lays Leicester for £75, i.e. he bets that Arsenal will win or that the match will be drawn If Arsenal win, Alex wins £125 (i.e. £100*5/4) and will also receive back his original £100 stake. In this case, Belinda pays out £125 as well as returning the £100 stake money she received. Charlotte loses her £75 stake. David keeps the £75 stake he originally received.

If Leicester win, Alex loses his £100, and Belinda keeps the £100 stake money she received. Charlotte wins £150 (i.e. £75*2/1) and also gets her original £75 stake back, while David pays out £150 and also returns the original £75 stake money he received.

If the match ends in a draw, Alex loses his £100 stake. Belinda keeps the £100 stake money. Similarly, Charlotte loses her £75 stake and David gets to keep the £75 he originally accepted.

Table 1. below summarises all of the possible outcomes:

TABLE 1

| | Alex | | | Belinda | | | Charlotte | | | David | | |
|---|---|---|---|---|---|---|---|---|---|---|---|---|
| | Out | In | +/− | Out | In | +/− | Out | In | +/− | Out | In | +/− |
| Arsenal win | (100) | 225 | 125 | (225) | 100 | (125) | (75) | 0 | (75) | 0 | 75 | 75 |
| Leicester win | (100) | 0 | (100) | 0 | 100 | 100 | (75) | 225 | 150 | 225 | 75 | (150) |
| Draw | (100) | 0 | (100) | 0 | 100 | 100 | (75) | 0 | (75) | 0 | 75 | 75 |

FIG. 3 shows an example pricing screen 6 as it might appear after a number of bets have been placed for an Arsenal vs. Leicester match.

The pricing screen 6 gives price and size indications for both sides of the market for all possible outcomes for that event only. One side 7 of the market comprises the "backing" side, in which the prices and sizes available to back an outcome are displayed. The other side 8 comprises a "laying" side, in which the prices and sizes available to lay an outcome are displayed. The meaning of the price and size indications will become apparent from the detailed description below.

The convention for digital betting is that odds are displayed inclusive of the stake. For example, odds of 5/4 are shown as 2.25.

The pricing screen 6 shows, for example, the best three prices currently available on each side 7, 8 of the market and the sizes corresponding to each price, namely the amount of money that can be wagered at each of the prices. For example, a customer can back Arsenal to win at a price of 2.2 (box 9). This is the total amount he will receive back if he stakes £1, so the actual odds are 1.2 to 1, i.e. 6/5 in traditional parlance. This is the best price available and is valid for a total size of £115. This means that the customer can bet £115 on Arsenal to win at 2.2 and know that there are other customers who are willing to accept that bet. As a result, the bet will be filled immediately. The filling of a bet is also referred to herein as accepting or matching a bet.

Similarly, the pricing screen 6 also shows that a customer can lay Arsenal at a price of 2.3 (i.e. odds of 1.3 to 1) (box 10) and that there are other customers who are willing to put a total of £400 on Arsenal to win at those odds. Thus, the customer who wants to lay Arsenal at 2.3 can have that bet filled immediately if the stake size is £400 or less.

Other entries on the display screen 6 show that, for example, the best price available for backing Leicester is 3.1 for a stake size of £113 (box 11), the next best price is 3 for a stake size of £80 (box 12) and the best price for laying a draw is 4.5 for a stake size of £56 (box 13).

A customer enters a bet by entering his selection, stake and odds in the appropriate input boxes 14, 15, 16 on the display 6. For example, to lay Arsenal for £200 at 2.3, the customer enters "Arsenal" in the Selection box 14, "200" in the Stake box 15 and "2.3" in the Odds box 16 and clicks on the "Lay Selection" button 17.

As soon as the bets have been entered into the system, and confirmed, all customers looking at the pricing screen for the Arsenal vs. Leicester game will see their screens update immediately to show the new price and size quotations, reflecting the latest bets.

Customers are not allowed to place bets unless they have sufficient funds in their account to cover any outcome on the bet. When backing an event, the maximum amount a customer can lose is equal to the stake, whereas when laying an event the amount that could be lost is equal to the stake times the odds. If a customer backs more than one outcome in a particular event the maximum loss is simply the sum of all the stake money wagered. However, if a customer lays several outcomes in the same event the maximum loss is the highest individual loss less the other stake money (as the customer can only pay out on one event). Similarly, if a customer backs all outcomes in a particular event he is sure to have backed the winner or, in appropriate circumstances, all of the winners.

The betting exchange system keeps continuous track of every customer's credit exposure. Since the betting exchange system does not know whether or not pending bets placed by the customer will or will not be filled, exposure calculations are performed by looking at all possible outcomes and assuming the worst each time, bearing in mind any interdependencies that may exist between bets. Exposure calculations on odds bets are the easiest to perform of the various types of bet disclosed herein, as the payouts are always known and there can only be one winner. With other types of bet described below, such as line bets and spread bets, the system has to run a worst case scenario at each level at which the punter has struck a bet.

All customers receive a confirmation of the bets they have placed, for example over the Internet or by e-mail. They are able to determine how frequently these confirmations are sent, for example, after every bet, at the close of an event, at the end of each day and so on. In addition, customers are notified of all pending bets that have lapsed. The concept of a pending bet is explained in detail below.

Figure 4:
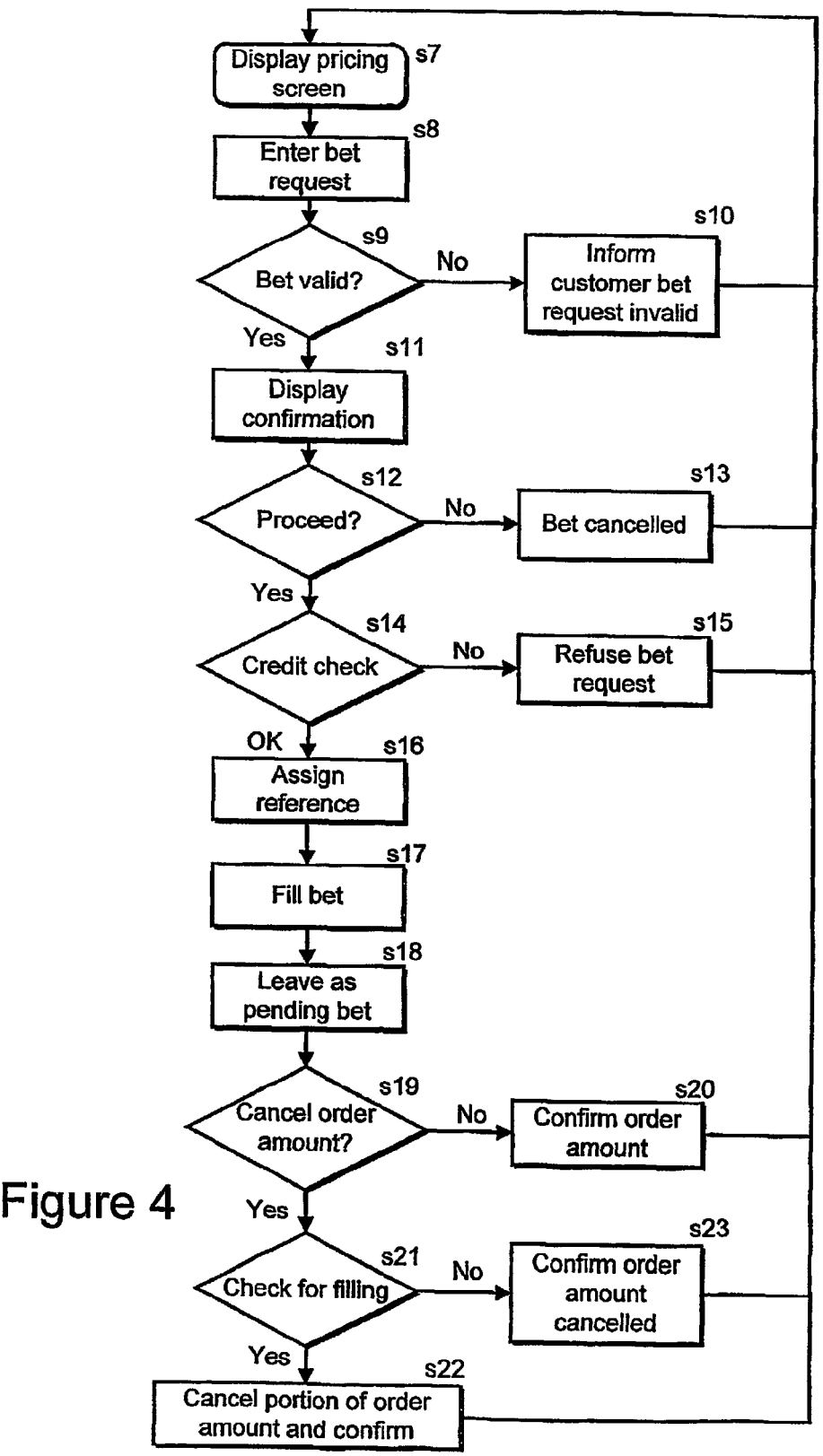
FIG. 4 is a flow diagram illustrating the operation of the betting exchange system according to the invention.

Referring to FIG. 4, a full explanation of an example of the operation of the system is now described in relation to a customer who wishes to put £200 on Arsenal to win at a price of 2.2, starting from the pricing screen display shown in FIG. 3, and following on from the screen display step referred to in FIG. 2 as step s7.

First, referring again to FIG. 3, the customer enters a bet request by entering "Arsenal" in the Selection box 14, "200" in the Stake box 15 and "2.2" in the Odds box 16 and clicking on the "Back Selection" button 18 (step s8). The system checks if the bet is valid, for example, to ensure that the number ranges correspond to those recognised by the system (step s9), and if not informs the customer that the bet is invalid (step s10).

If the bet request is valid, the system displays a confirmation of the bet request, including a payout profile illustrating the possible profits and losses (step s11). The system then checks if the customer wishes to proceed (step s12) and if he does not, displays a message informing him that the bet request has been cancelled (step s13).

If the customer wishes to proceed, the system checks whether he has sufficient credit to place a bet (step s14), by reconciling the customer's account balance with the bet request and all outstanding unfilled, filled and settled bets. As mentioned above, the system performs exposure calculations to determine if, in a worst case scenario, the customer's account might go into negative territory if the bet request is accepted, in which case the bet request is refused (step s15).

If the bet request is accepted, the system assigns a unique reference number to it (step s16). Customers are informed of these numbers. In addition, the system assigns a unique reference to every portion of the bet request that is filled and keeps a record of the corresponding reference for the portion of the bet with which it is being matched. These references exist to provide an audit trail.

Figure 5:
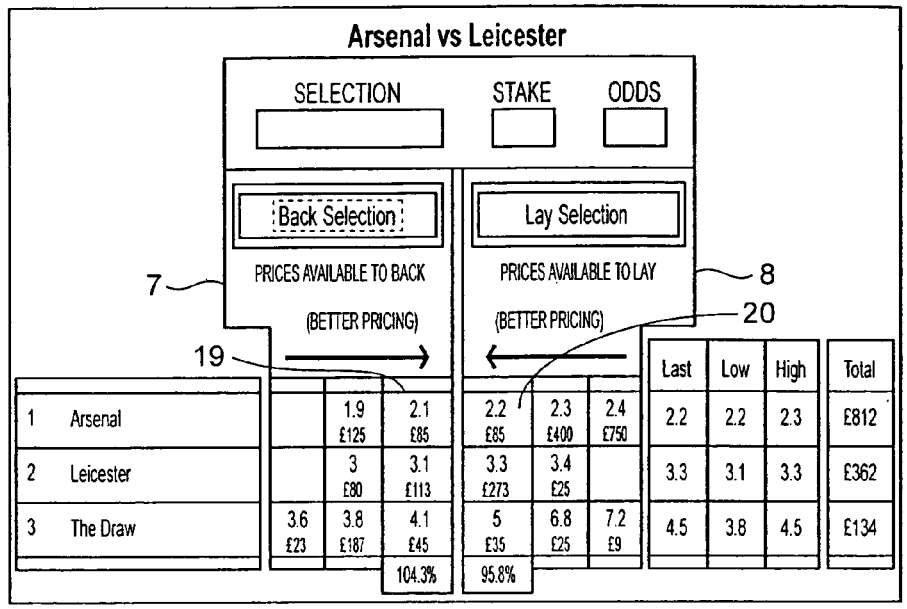
FIG. 5 is a screen shot showing a first change in the pricing screen of FIG. 3 following a bet placed.

The system then fills as much of the bet as possible (step s17). In this example, referring again to FIG. 3, the pricing screen 6 currently shows (box 9) that only £115 is available at the customer's chosen price of 2.2. Therefore, £115 is filled immediately. This amount is referred to herein as the filled amount. The remaining part of the bet, referred to herein as the order amount, is left on the system as a pending bet (step s18). In this example, the remaining order amount is £85. The system confirms the filled amount to the customer and asks if he or she wishes to cancel the order amount (step s19). If the customer wishes the order amount to stay on the system, the system confirms this (step s20) and the pricing screen display is updated, to display the screen shown at FIG. 5. This shows that the price of 2.2 to back Arsenal is no longer available, since this has been filled, the best price now being 2.1 for a size of £85 (box 19).

A new best price to lay Arsenal also appears on the updated pricing screen (box 20). This represents the pending bet left on the system. The pending bet shows up on the pricing screen 6 on the "lay" side 8 of the market which indicates that the bet is available to be filled from the "lay" side 8, since a pending bet on the "back" side 7 of the market immediately becomes available to be filled from the "lay" side of the market, and vice versa. Put another way, the first customer described above wishes to back Arsenal for £85 at a price of 2.2, so his bet will only be accepted when a second customer wishes to lay Arsenal for that amount at that price.

Figure 6:
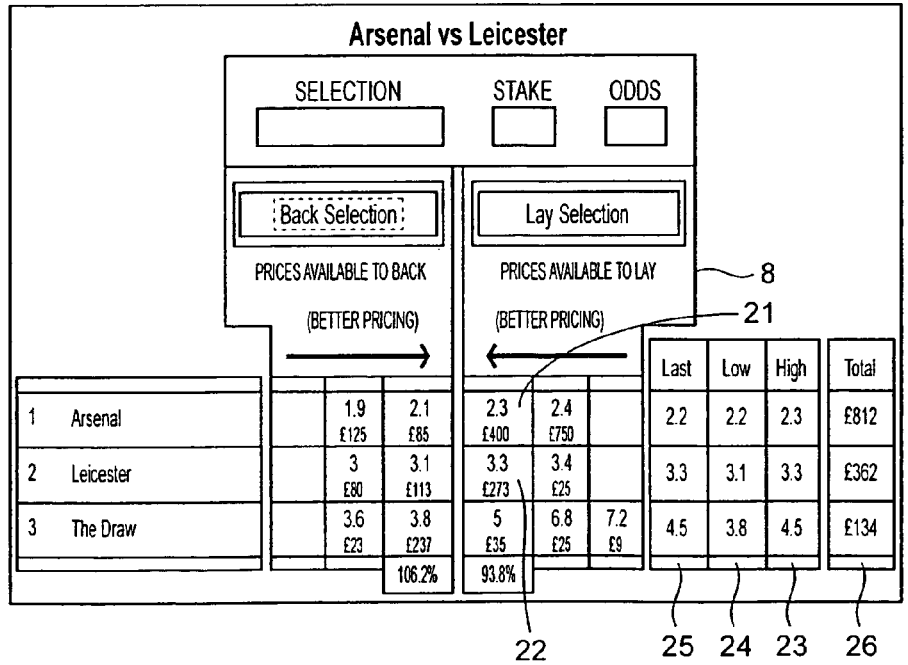
FIG. 6 is a screen shot showing a second change in the pricing screen of FIG. 3 following a bet placed.

Referring again to FIG. 4, if the customer wishes to cancel the order amount in response to the system request at step s19, the system checks to see whether this amount has already been wholly or partially filled (step s21). If the amount has already been wholly or partially filled, the system cancels as much of the order amount as possible and confirms this to the customer (step s22). If the order amount has not been filled, cancellation is confirmed (s23) and the resulting screen display is shown in FIG. 6. The price of 2.2 to back Arsenal is again no longer available, but the best price to lay Arsenal remains at 2.3 (box 21).

In general terms, the amounts displayed on the pricing screen 6 as available at different prices, on both the "back" 7 and "lay" 8 side of the market, are an aggregation of all of the various pending bets which have been placed on the system. As long as a pending bet remains outstanding, the system will fill it as soon as it becomes possible to do so. For example, the bet placed above of £85 at 2.2 will be filled when another customer decides that they want to lay Arsenal to win at odds of 2.2. If only part of the order can be filled (e.g. someone is only prepared to lay Arsenal for an amount of £20) then the system will do this and leave the rest (£65 in this case) as a pending bet. Customers can always cancel their pending bets, as well as any unfilled portion of a bet. However, once the system has matched up and "filled" any outstanding bets, subject to suitable confirmation, these bets cannot be cancelled.

Although the system aggregates all equivalent pending bets at the same price, it executes them in the order in which they arrived at the exchange. For example, Alex submits a bet to lay Arsenal for £50 at a price of 2. Belinda comes along a little later and submits the same bet. Charlotte now submits a bet to back Arsenal at a price of 2 with an £80 bet. The system fills this bet by taking all of Alex's £50 and £30 of Belinda's £50, leaving £20 of Belinda's money still unfilled. Belinda's money effectively sits behind Alex's.

To ensure that customers have to make meaningful improvements in their offered odds if they want to queue jump ahead of other punters, the betting exchange system maintains a pricing structure for all bet types. For example, 2.1, 2.2 and 2.3 are all acceptable prices for bets but 2.25 and 2.26 are not. Similarly 31 and 32 are acceptable but 31.5 is not, whereas 1.8, 1.85 and 1.9 are all acceptable. An exponential scale governs the increment size.

For example, referring to FIG. 6, if a customer wishes to have a bet on Leicester at odds of 3.3, he sees on the pricing screen 6 that £273 is already available to lay at the price of 3.3 (box 22). If he places a bet request at that price, his amount will have to sit behind this amount. If there were no price structure in place, the customer could put in a bet request at 3.299, which would be virtually the same bet, but would get him to the front of the queue.

Best Fill Feature

A further feature of the invention is that the system will automatically fill a customer's bet to his best advantage. If, in the above example, the customer had simply entered that he wanted to have £200 on Arsenal to win at a price of 2.1 and the £115 was still available at a price of 2.2, then the system would automatically allocate the first £115 of the customer's £200 to the 2.2 price and the remaining £85 at the 2.1 price. This ensures that the customer always gets the best value available on the system. The same is true if the customer is laying an outcome rather than backing it.

Referring to FIG. 6, in addition to showing live price and size indications for each outcome, the pricing screen 6 also shows the highest and lowest prices that have been successfully filled (boxes 23, 24), the price at which the most recent bet was transacted (box 25), and the total volume of bets that have been filled (box 26). This information allows the customer to make a fully informed decision when considering placing a bet. All of the information on the screen is updated automatically by the system and reflects the views and actions of all participants in the market.

Arbitrage

There will be occasions with fixed odds betting when, even though one side of the market has not been taken up, it will still be possible to fill bets on the other side of the market, an operation which is referred to herein as arbitrage. The betting exchange system performs an arbitrage function by automatically filing bets in such a way that the system operator does not lose money. Arbitrage opportunities arise where a collection of bets of a similar type (i.e. to back or to lay), all on the same event, can be automatically filled by the exchange in the sure knowledge that whatever the outcome of the event, the system operator will not lose money.

Figure 7:
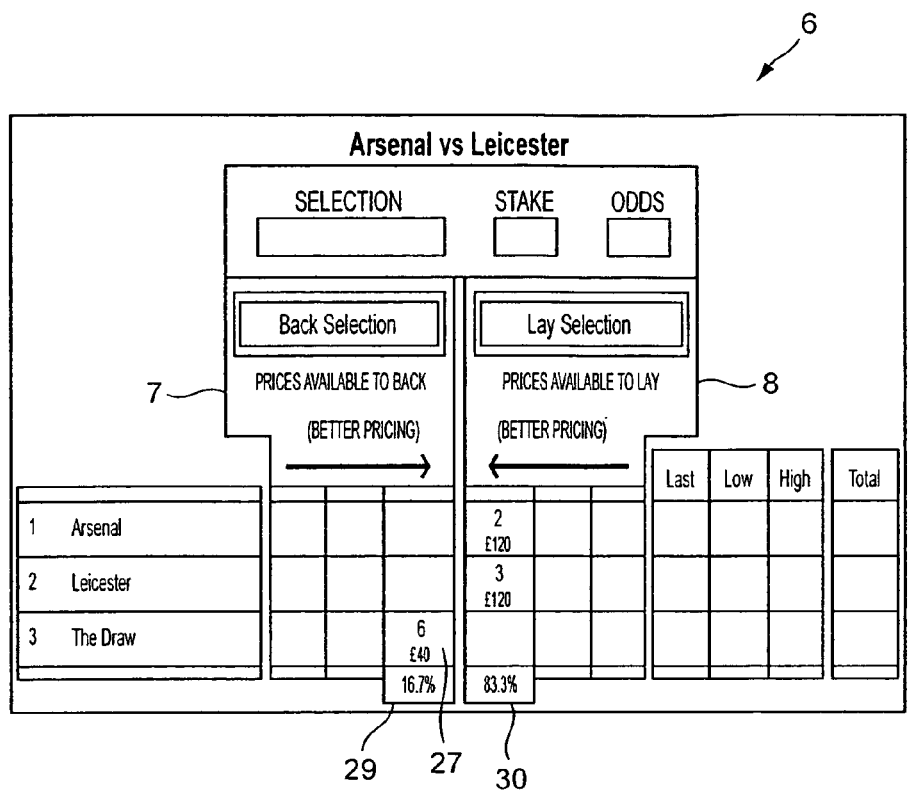
FIG. 7 is a screen shot showing a pricing screen which illustrates the arbitrage feature of the invention.
Figure 8:
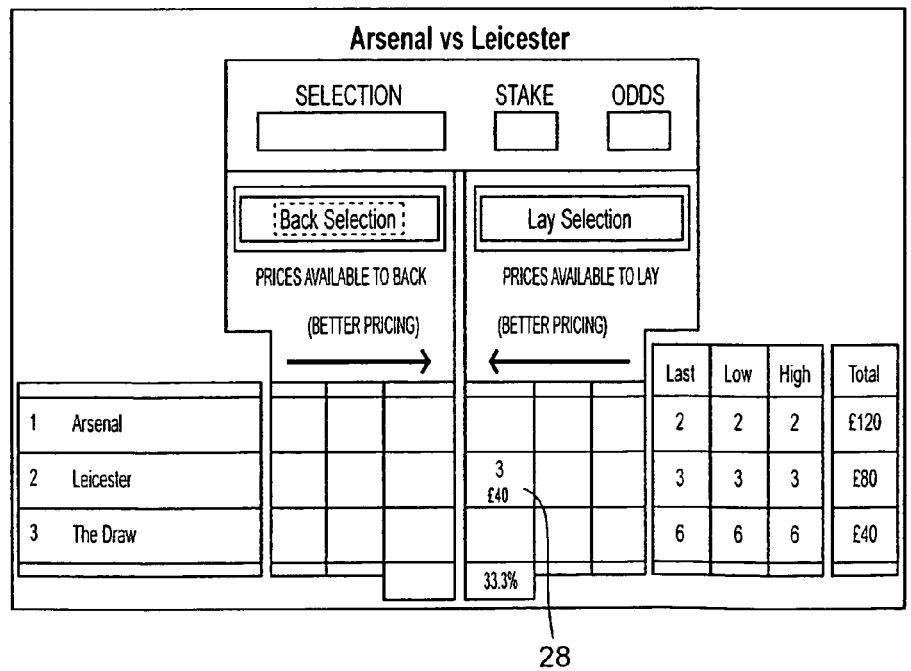
FIG. 8 is a screen shot showing the change in the pricing screen of FIG. 7 following a bet placed.

For example, Alex is prepared to put £120 on Arsenal to win at a price of 2.0 and Charlotte is prepared to back Leicester to win at a price of 3.0, also for £120, and both have entered their requests into the system, in accordance with the procedure described above. The system will now automatically create an implied bet, namely a price at which it is willing to lay the draw. In this example it lays the draw for £40 at a price of 6.0. Referring to FIG. 7, as there is now someone prepared to lay the draw, the pricing screen 6 shows that customers can back the draw immediately, for a total of £40 at a price of 6.0 (box 27). Assuming Edward now decides to accept the odds being offered for the draw and backs the draw at 6.0 for the whole £40, his bet will immediately be taken up. At the same time, all of Alex's £120 bet will be taken up, as will £80 of Charlotte's bet. The resulting pricing screen is shown in FIG. 8, in which all of the bets have been executed, leaving £40 of Charlotte's bet unfilled (box 28). The matching of bets for each outcome is illustrated in Table 2. below.

TABLE 2

| | Alex | | | Charlotte | | | Edward | | |
|---|---|---|---|---|---|---|---|---|---|
| | Out | In | +/− | Out | In | +/− | Out | In | +/− |
| Arsenal win | (120) | 240 | 120 | (80) | 0 | (80) | (40) | 0 | (40) |
| Leicester win | (120) | 0 | (120) | (80) | 240 | 160 | (40) | 0 | (40) |
| Draw | (120) | 0 | (120) | (80) | 0 | (80) | (40) | 240 | 200 |

Therefore, in this instance, even though no individual explicitly stated that they wanted to lay any of the outcomes, the betting exchange system is able to transact three separate bets.

An example of the way in which the system assesses the arbitrage position is to look at the book total, which is the sum of the reciprocal of the prices in a column expressed as a percentage, as shown for example in FIG. 7 (boxes 29 and 30). In this example, 83.3%=(½+⅓) expressed as a percentage, and 16.7%=⅙ expressed as a percentage.

On the "available to lay" side 8, there will be arbitrage if the book total is equal to or above 100%. On the "available to back" side 7 there will be arbitrage if the book total is equal to or below 100% and there are bets available for all possible selections. Referring to FIG. 8, when Edward takes the bet on the draw, the book total for the "available to lay" side is 100% (½+⅓+⅙), which enables the system to execute arbitrage, resulting in the three executed bets.

In this example, in response to Alex's and Charlotte's bets, the system calculates the odds of x to lay the draw so as to fulfill the condition that: (½+⅓+1/x)*100=100%, i.e. the probabilities of all the outcomes add up to 1 (certainty). Therefore, x=6.

The system calculates the sizes which will be filled by the arbitrage, by taking the minimum payout (price*size) over all selections, and then calculating the size for each selection which results in that payout. In this example, the minimum payout is £240 in respect of Alex's bet (£120*2), so to achieve this for Charlotte at a price of 3, £80 of her bet is filled. Similarly, the system calculates the size of the implied bet as £40, since 6*40=240.

The arbitrage price is generally unlikely to be a round number, and is marked up or down to the nearest acceptable number in the price structure of the system that will not cause the system to lose money.

Figure 9:
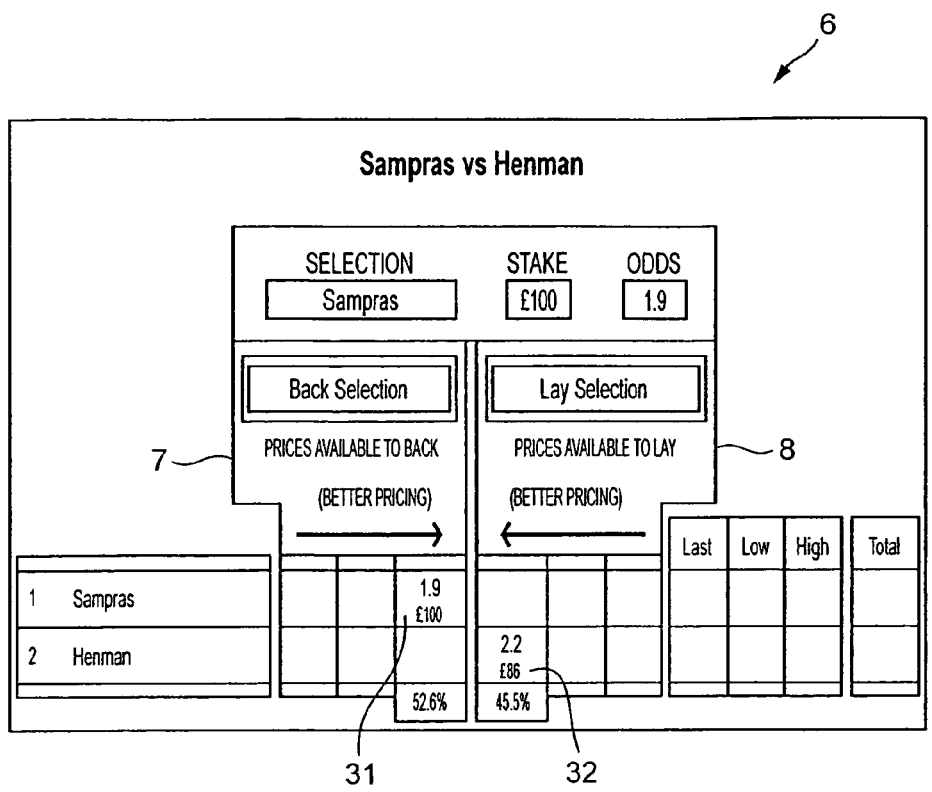
FIG. 9 is a screen shot showing a pricing screen illustrating one example of the creation of implied bets.
Figure 10:
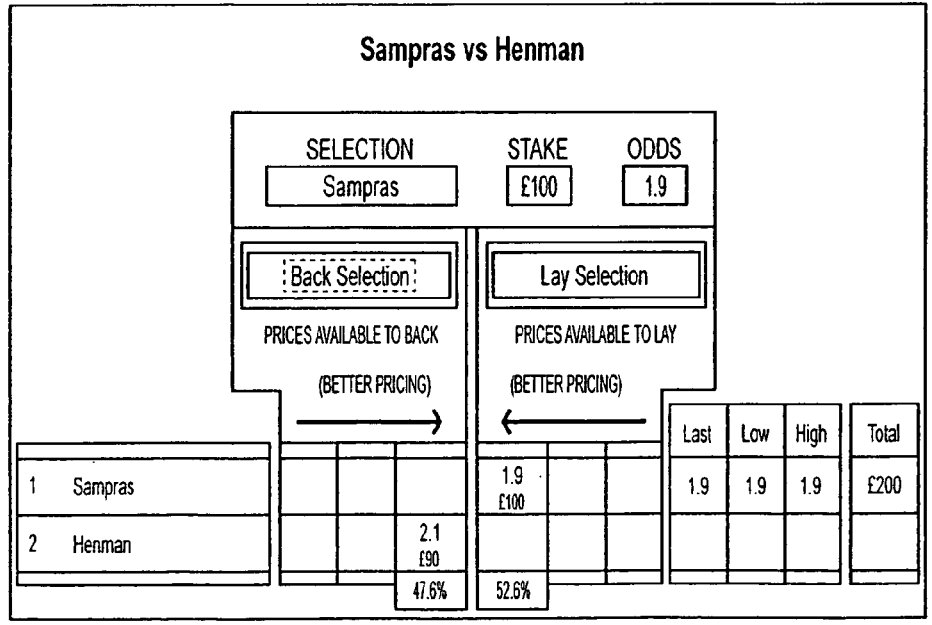
FIG. 10 is a screen shot showing a pricing screen illustrating a further example of the creation of implied bets.

The generation of implied bets by the betting exchange system and the marking up/down effect is further illustrated by reference to FIGS. 9 and 10, which show betting on an event which has only two possible outcomes, in this case a tennis match. FIGS. 9 and 10 each show the position after only a single bet of £100 at a price of 1.9 has been placed on Sampras. FIG. 9 shows the pricing screen 6 after a bet to lay Sampras, while FIG. 10 shows the pricing screen after a bet to back Sampras.

Referring to FIG. 9, a bet 31 by a customer to lay Sampras causes the betting exchange system to generate an implied bet 32 on Henman, since there are only two possible outcomes, namely 'Sampras' and 'NOT Sampras'. In accordance with the principles of the invention, the implied bet appears on the Lay Selection side 8. The implied bet price and size is the reciprocal of the actual bet price and size (i.e. 1/1.9 +1/x=1), adjusted to conform to the pricing structure imposed by the betting exchange system. Therefore, in this example, a punter accepting the bet to back Sampras for £100 would have a possible return of £190, whereas the equivalent implied bet on Henman, generates a theoretical return price times size) of £189.20.

FIG. 10 illustrates that a bet to back Sampras generates a different price and size for the implied bet to lay Henman, again caused by the imposed pricing structure working to ensure that the system operator does not lose money.

Line Betting

In another example of the invention, the betting exchange system is used for another form of betting, known as line betting. This type of betting is particularly popular in the US and is similar in concept to spread betting.

Line betting can be thought of as handicapping, with the value of the line being set such that the only two possible outcomes are both equally likely. As a result, the odds on both outcomes are the same, i.e. evens.

The principles of line betting are illustrated by reference to the following example. England are to play New Zealand at rugby and the general view is that New Zealand will beat England by 12 points. Effectively, therefore, people believe that if New Zealand were to be handicapped by 12 points, either side would be as likely to win. A "draw" would still be possible if New Zealand beat England by 12 points. However, if New Zealand are handicapped by 12.5 points, a draw is not possible. Thus, the line in this example is the "New Zealand Supremacy line" and is set at +12.5. FIG. 11 shows a pricing screen 33 for this example. A customer buys the line at +12.5 (box 34) if he thinks that New Zealand will win by more than 12 points and sells the line at 11.5 (box 35) if he thinks that New Zealand will win by less than 12 points, which includes the outcome that England win.

As stated above, the odds on the line on the betting exchange system are even money, since the system does not need to incorporate a bookmaker's overround into the pricing.

Figure 12:
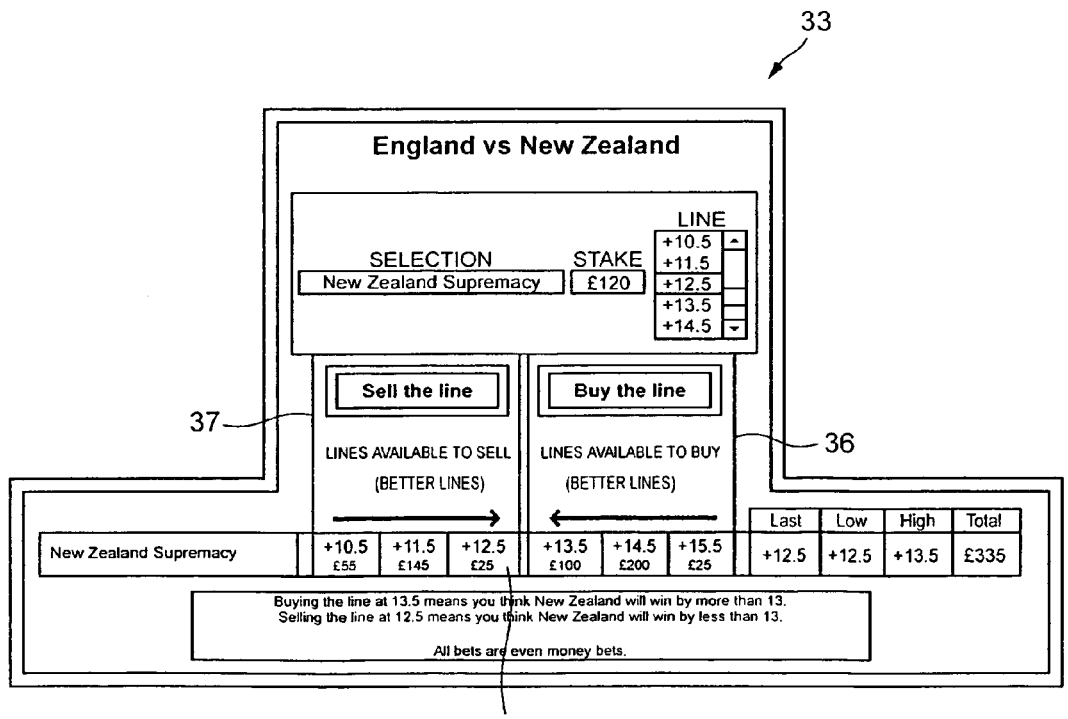
FIG. 12 is a screen shot showing the change in the pricing screen of FIG. 11 following a further bet placed.

As with fixed odds betting, the pricing screen 33 shows price and size indications for the line and is divided into a buy section 36, indicating the lines available to buy, and a sell section 37, indicating the lines available to sell. Customers can either take the prices indicated or leave orders on the system, as in the case of the first embodiment. For example, a customer buys the line at +12.5 for £120 by filling in the Selection box 38, which may be filled automatically by the system when there is only one selection, as in this example, putting £120 in the Stake box 39 and selecting +12.5 from the Line menu 40, as shown in FIG. 12, and then clicking on the Buy button 41. The betting exchange system accepts the bet in respect of the available £95 (box 34) shown in FIG. 11 and places the remaining £25 in the Sell section 37 as a line available to sell under +12.5 (box 42) shown in FIG. 12. As in the case of the first embodiment, the system automatically fills all bets as soon as possible.

The returns on line betting equate to digital odds of 2.0. So, if a customer buys the line and wins, for example, New Zealand win by more than 12.5 points, he gets back his stake and the same amount again, less a commission charge, for example 4%. If he loses, he forfeits his stake but does not pay any commission.

As in the first embodiment describing fixed odds betting, the best fill feature which ensures that the system will automatically fill a customer's bet to his best advantage also applies to the case of a customer placing a line bet, the difference being that a customer receives a more favourable line instead of a more favourable price.

Spread Betting

In a further example of the invention, the betting exchange system provides a spread betting facility as illustrated with reference to FIGS. 13 to 15. Spread betting is similar to line betting in the sense that a customer buys or sells at a certain level.

In this example, illustrated by Formula 1 driver performances in the Korean Grand Prix, there are 85 points to play for, made up of 50 points for first place, 25 points for second and 10 points for third.

Figure 13:
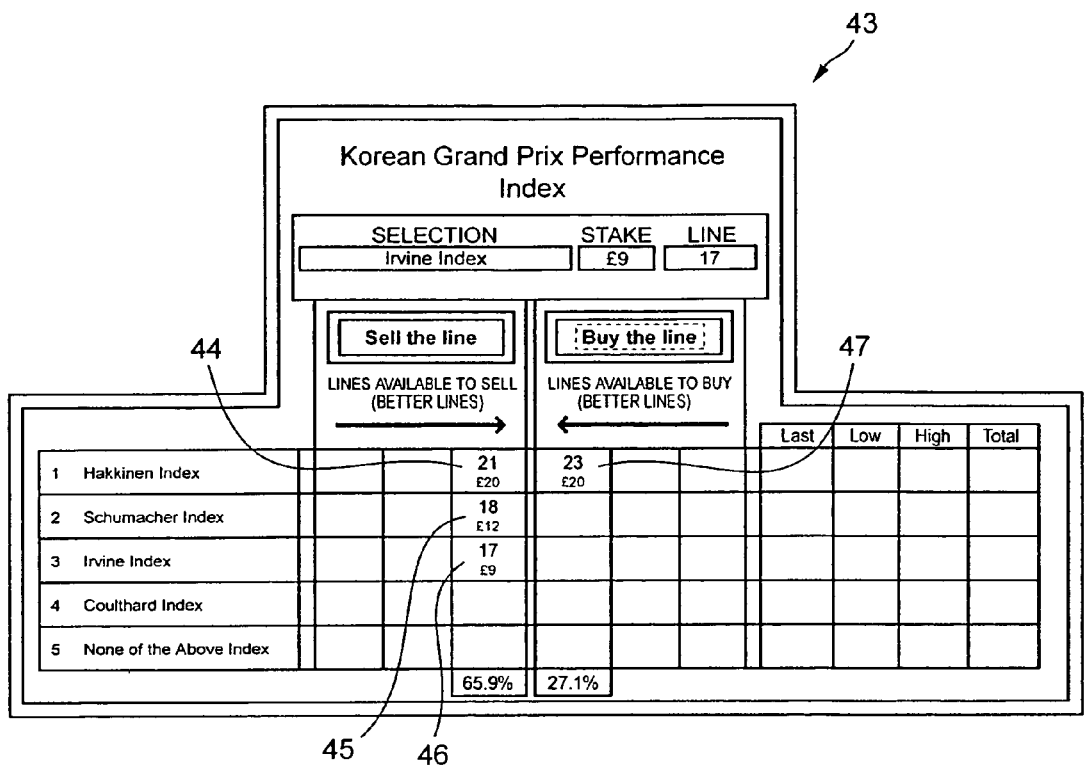
FIG. 13 is a screen shot showing a pricing screen which illustrates spread betting.
Figure 14:
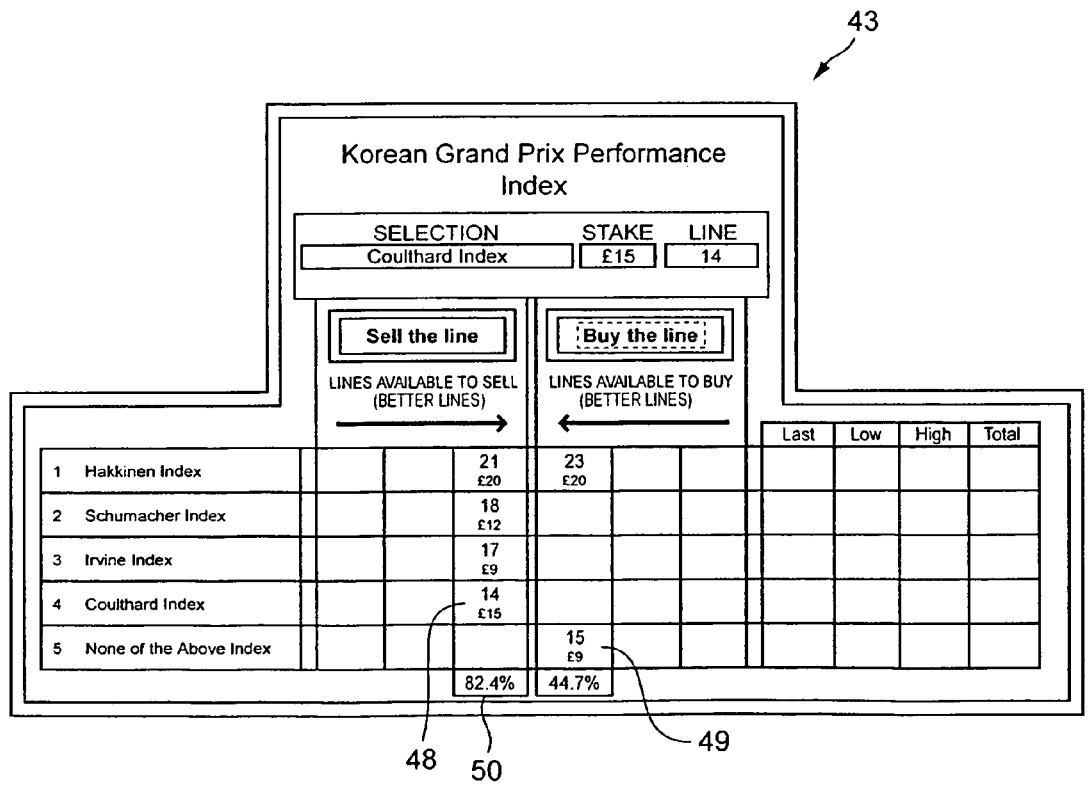
FIG. 14 is a screen shot showing a change in the pricing screen of FIG. 13 following a bet placed.

Referring to FIG. 13, the pricing screen 43 shows bets "available to sell" for the first three drivers (boxes 44, 45, 46), with an additional bet "available to buy" for Hakkinen (box 47). FIG. 14 illustrates the pricing screen 43 when a customer attempts to buy Coulthard at 14 (box 48), the system posting the bet as "available to sell" on the screen. As a result of this, an implied available bet is generated on "None of the above" (box 49). The price of the implied bet is 15, which, if taken up, would bring the total of the left hand column 50 to the required 85 points (100%). The size is £9, which is the minimum of all the sizes on the left hand side.

Figure 15:
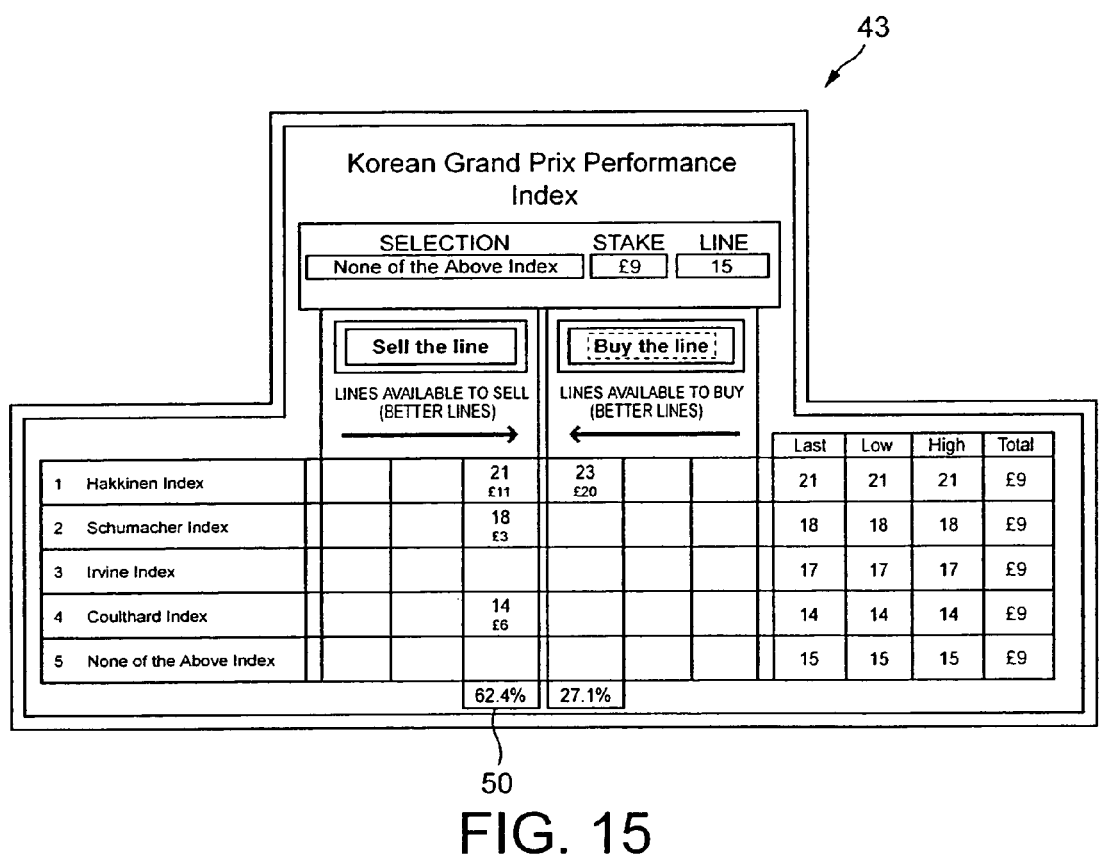
FIG. 15 is a screen shot showing a change in the pricing screen of FIG. 14 following a bet placed.

FIG. 15 shows the pricing screen 43 after the bet on "None of the above" has been taken in full. The "None of the above" bet disappears and £9 is taken off of all the other bets in the left hand column 50.

The payout profile of a spread bet is not binary. When buying or selling levels, the punter does so on a per points basis. For example, if he buys the line at 21 for £10 a point, and the selection scores 50, he will make £290 (less commission). If the selection scores 0 he will lose £210. There may be various related selections in a spread event, in which case there will be possible arbitrage. This assumes that there is a fixed amount of points available for distribution on settlement of the event. Spread betting arbitrage has already been described above in relation to FIGS. 13 to 15.

Once an event has finished the betting exchange system will settle all bets. If a customer has won on a bet, the winnings are transferred to the customer's account on the system, less the, for example, 4% commission that the system operator charges. If a customer has lost, then the losing amount is deducted from the customer's account on the system. At the end of each day all accounts will be reconciled to ensure that it is only possible for any errors to exist in the system for a maximum of one day.

While the above invention has been described primarily in relation to betting over the Internet, any form of communications network which provides similar functionality is suitable to implement the invention.

The invention claimed is:

1. A betting exchange system for permitting a plurality of users to bet against one another, the system comprising:
   a server configured to receive bet offers and bet requests from the plurality of users over a communications network, each of said offers specifying a price at which the user originating the offer is prepared to lay a given outcome, together with a bet size offered at said price,
   the server being arranged to aggregate said offers to provide a first set of information for display to said plurality of users, said first set of information including the best price at which each of the possible outcomes is available to be backed at a given time and the aggregated size available at said best price, and each of said requests specifying a price at which the user originating the request is prepared to back a given outcome, together with a bet sire requested at said price,
   said server being operable to match said bet offers with said bet requests based on said specified prices and sires,
   and in the event that the server cannot match said requests at the prices and sizes specified, the server being further arranged to aggregate said bet requests to provide a second set of information for display to said plurality of users, said second set of information including the best price at which each of the possible outcomes is available to be laid at a given time and the aggregated size available #at said best price, and
   the server being operable to update the first and second sets of information for display to said users in response to received bet offers and bet requests, such that said users can in real-time see the best price at which they can back or lay any outcome and the total size available at that price,
   to thereby permit the plurality of users to bet against one another.

2. A betting exchange system for permitting a plurality of users to bet against one another, the system comprising:
   a computer receiving bet offers and bet requests from the plurality of users over a communications network, each of said offers specifying a price at which the user originating the offer is prepared to lay a given outcome, together with a bet size offered at said price,
   the computer aggregating said offers to provide a first set of information for display to said plurality of users, said first set of information including the best price at which each of the possible outcomes is available to be backed at a given time and the aggregated size available at said best price, and each of said requests specifying a price at which the user originating the request is prepared to back a given outcome, together with a bet sire requested at said price,
   said computer matching said bet offers with said bet requests based on said specified prices and sizes, and
   in the event that the computer cannot match said requests at the prices and sizes specified, the computer aggregating said bet requests to provide a second set of information for display to said plurality of users, said second set of information including the best price at which each of the possible outcomes is available to be laid at a given time and the aggregated size available at said best price, and
   the computer updating the first and second sets of information for display to said users in response to received bet offers and bet requests, such that said users can in real-time see the best price at which they can back or lay any outcome and the total size available at that price,
   to thereby permit the plurality of users to bet against one another.

3. A betting exchange system for permitting a plurality of users to bet against one: another, the system comprising:
   a computer being configured:
   to receive over a communications network a plurality of bet requests backing a given outcome, each backing bet request specifying a price and a size at which an originator of the request is prepared to bet that the given outcome will occur;
   to receive over a communications network a plurality of bet requests laying the given outcome, each laying bet request specifying a price and a size at which an originator of the request is prepared to bet that the given outcome will not occur;
   to aggregate backing bet requests specifying the same price;
   to aggregate laying bet requests specifying the same price;
   to automatically match a received backing bet request with individual or aggregated laying bet requests to complete a betting transaction; and
   to automatically match a received laying bet request with individual or aggregated backing bat requests to complete a betting transaction,
   to thereby permit the plurality of users to bet against one another.

4. A system according to claim 3, operable to provide, for display to each of said plurality of users, a price at which a bet can be placed and the size of the bet which can be made at said price.

5. A system according to claim 3, wherein the system is arranged to automatically match a respective backing or laying bet request with respective individual or aggregated bet requests at a better price than that requested by the originator, if available, and thereby automatically fill the originator's bet to the originator's best advantage.

6. A system according to claim 3, wherein the system is arranged to match a received bet request with an individual or aggregated bet request up to the size specified in the received bet request, leaving an unmatched portion as a pending bet request.

7. A system according to claim 6, wherein the system is arranged to subsequently match the pending bet request with a subsequently received backing or laying bet request respectively.

8. A system according to claim 3, further configured to automatically arbitrage the bet requests to thereby generate one or more implied bets made by the system in respect to an outcome for which no bet requests have been received, wherein the implied bets are generated so that the system does not lose money on the implied bets taken together.

9. A system according to claim 8, operable to provide, for display to each of said plurality of users, a price at which a bet can be placed and the size of the bet which can be made at said price, said price and size deriving from the received bet requests or from said one or more implied bets.

10. A system according to 8, configured to calculate the price of an implied bet as the price which, when combined with the prices of the bets in respect of all other possible outcomes, represents a certainty.

11. A system according to claim 8, configured to calculate the price of an implied bet as the price which, when multiplied by the size of the implied bet, equals the minimum payout for all of the received bets.

12. A system according to claim 3, configured to match respective bet requests as soon as requests capable of being matched become available.

13. A system according to 3, further comprising an exposure calculator for calculating for a betting transaction the maximum financial exposure faced by the originator of a bet request, the system being arranged to reject the bet request in the event that the calculated exposure exceeds the originator's credit limit.

14. A system according to claim 13, wherein the system maintains a pricing structure arranged to control the prices at which bet requests are made, the system being configured to reject bet requests that do not conform to the pricing structure.

15. A system according to claim 14, wherein said pricing structure includes minimum price increments.

16. A system according to claim 15, wherein a size of the minimum price increments varies with price.

17. A betting exchange system comprising:
  means for receiving over a communications network a plurality of bet requests backing a given outcome, each backing bet request specifying a price and a size at which an originator of the request is prepared to bet that the given outcome will occur;
  means for receiving over a communications network a plurality of bet requests laying the given outcome, each laying bet request specifying a price and a size at which an originator of the request is prepared to bet that the given outcome will not occur;
  means for aggregating backing bet requests specifying the same price;
  means for aggregating laying bet requests specifying the same price;
  means for automatically matching a received backing bet request with individual or aggregated laying bet requests to complete a betting transaction; and
  means for automatically matching a received laying bet request with individual or aggregated backing bet requests to complete a betting transaction.

18. A method of operating a betting exchange system comprising:
  receiving by a computer over communications network a plurality of bet requests backing a given outcome, each backing bet request specifying a price and a size at which an originator of the request is prepared to bet that the given outcome will occur;
  receiving by the computer over a communications network a plurality of bet requests laying the given outcome, each laying bet request specifying a price and a size at which an originator of the request is prepared t bet that the given outcome will not occur;
  aggregating, by the computer, backing bet requests specifying the same price;
  aggregating, by the computer, laying bet requests specifying the same price;
  automatically matching, by the computer, a received backing bet request with individual or aggregated laying bet requests to complete a betting transaction; and
  automatically matching, by the computer, a received laying bet request with individual or aggregated backing bet requests to complete a betting transaction.

19. A method according to claim 18, including providing for display to each of the plurality of users, the size of a bet which can be made at a given price.

20. A method according to claim 18, including maintaining a pricing structure arranged to control the prices at which bets are placed.

21. A method according to claim 20, wherein said pricing structure includes minimum price increments.

22. A method according to claim 21, wherein a size of said minimum price increments varies according to price.

23. A method according to claim 19, including, in the event that a bet request to make a bet at the given price exceeds the provided size, accepting the bet in respect of the provided size.

24. A method according to claim 23, further comprising accepting as a pending bet the amount by which the bet exceeds the provided size.

25. A method according to claim 24, further comprising providing the pending bet for display to each of the plurality of users.

26. A method according to claim 18, comprising, in the event that a better price is available to the user than that included by the user in a bet request, matching the requested bet at said better price.

27. A method according to claim 18, comprising generating an implied bet in respect of an outcome for which no bets have been received.

28. A method according to claim 27, including calculating the price of the implied bet for an outcome as the price which, when combined with the prices of the bets in respect of all other possible outcomes, represents a certainty.

29. A method according to claim 27, including calculating the size of the implied bet as the size which, when multiplied by the price of the implied bet, equals the minimum payout for all of the received bets.

30. A method according to claim 18, wherein a bet request to back an outcome comprises a received bet from a first market side, and a bet request to lay an outcome comprises a received bet from the second market side, further comprising matching a received bet request from one of the first and second market sides with an implied bet in the absence of a received bet from the other of the first and second market sides.

31. A method according to claim 18, comprising matching respective bets as soon as bets capable of being matched become available.

32. A method according to claim 18, further comprising calculating for a betting transaction the maximum financial exposure faced by the originator of a bet request and rejecting the bet request in the event that the calculated exposure exceeds the originator's credit limit.

33. A computer-readable medium having instructions stored thereon that that, when executed by a computer, cause the computer to perform the processes of:
receiving over a communications network a plurality of bet requests backing a given outcome, each backing bet request specifying a price and a size at which an originator of the request is prepared to bet that the given outcome will occur;
receiving a communications network a plurality of bet requests laying the given outcome, each laying bet request specifying a price and a size at which an originator of the request is prepared to bet that the given outcome will not occur;
aggregating backing bet requests specifying the same price;
aggregating laying bet requests specifying the same price;
automatically matching a backing bet request with individual or aggregated laying bet requests to complete a betting transaction; and
automatically matching a received laying bet request with individual or aggregated backing bet requests to complete a betting transaction.

34. A betting exchange system permitting a plurality of users to bet against one another, the system comprising:
a server configured to receive bet offers and bet requests from the plurality of users over a communications network, each of the offers specifying a price at which the user originating the offer is prepared to lay a given outcome, together with a bet size offered at the price, and each of said requests specifying a price at which the user originating the request is prepared to back a given outcome, together with a bet size requested at the price,
the server being operable to match the bet offers with the bet requests based on the specified prices and sizes,
in the event that the server cannot match bet offers with bet requests,
the server being arranged to aggregate unmatched offers to provide a first set of information for display to the plurality of users, the first set of information including the best price at which each of the possible outcomes is available to be backed at a given time and the aggregated size available at the best price, and
the server being arranged to aggregate unmatched bet requests to provide a second set of information for display to the plurality of users, the second set of information including the best price at which each of the possible outcomes is available to be laid at a given time and the aggregated size available at the best price, and
the server being operable to update the first and second sets of information for display to the users in response to received bet offers and bet requests, such that the users can in real-time see the best price at which they can back or lay any outcome and the total size available at that price,
to thereby permit the plurality of users to bet against one another.

35. A betting exchange system permitting a plurality of users to bet against one another, the system comprising:
a server receiving bet offers and bet requests from the plurality of users over a communications network, each of the offers specifying a price at which the user originating the offer is prepared to lay a given outcome, together with a bet size offered at the price, and each of said requests specifying a price at which the user originating the request is prepared to back a given outcome, together with a bet size requested at the price,
wherein the server comprises:
means for matching the bet offers with the bet requests based on the specified prices and sizes,
in the event that the server cannot match bet offers with bet requests,
means for aggregating unmatched offers to provide a first set of information which is displayed to the plurality of users, the first set of information including the best price at which each of the possible outcomes is available to be backed at a given time and the aggregated size available at the best price,
means for aggregating unmatched bet requests to provide a second set of information which is displayed to the plurality of users, the second set of information including the best price at which each of the possible outcomes is available to be laid at a given time and the aggregated size available at the best price, and
means for updating the displayed first and second sets of information in response to received bet offers and bet requests, such that the users can in real-time see the best price at which they can back or lay any outcome and the total size available at that price,
to thereby permit the plurality of users to bet against one another.

* * * * *

UNITED STATES PATENT AND TRADEMARK OFFICE
CERTIFICATE OF CORRECTION

PATENT NO. : 7,690,991 B2  Page 1 of 1
APPLICATION NO. : 09/959975
DATED : April 6, 2010
INVENTOR(S) : Andrew Black It is certified that error appears in the above-identified patent and that said Letters Patent is hereby corrected as shown below:

Column 11, Line 47, change "sire" to --size--.

Column 11, Line 49, change "sires," to --sizes,--.

Column 11, Line 57, change "#at" to --at--.

Column 12, Line 13, change "sire" to --size--.

Column 12, Line 32, change "one:" to --one--.

Column 12, Line 51, change "bat" to --bet--.

Column 13, Line 19, change "8," to --claim 8,--.

Column 13, Line 30, change "3," to --claim 3,--.

Column 14, Line 1, after "over" insert --a--.

Column 14, Line 9, change "t bet" to --to bet--.

Column 15, Line 7, after "thereon" delete "that".

Column 15, Line 14, after "receiving" insert --over--.

Column 15, Line 22, after "matching a" insert --received--.

Column 14, Line 6, change "the computer" to --a computer--.

Column 14, Line 11, change "the computer" to --a computer--.

Column 14, Line 13, change "the computer" to --a computer--.

Column 14, Line 15, change "the computer" to --a computer--.

Column 14, Line 18, change "the computer" to --a computer--.

Signed and Sealed this

Thirteenth Day of July, 2010

David J. Kappos
*Director of the United States Patent and Trademark Office*

(12) INTER PARTES REEXAMINATION CERTIFICATE (973rd)
United States Patent
Black

(10) Number: US 7,690,991 C1
(45) Certificate Issued: Oct. 23, 2014

(54) BETTING EXCHANGE SYSTEM

(75) Inventor: Andrew Wilson Black, London (GB)

(73) Assignee: The Sporting Exchange Ltd., London (GB)

Reexamination Request:
No. 95/000,561, Jul. 21, 2010

Reexamination Certificate for:
Patent No.: 7,690,991
Issued: Apr. 6, 2010
Appl. No.: 09/959,975
Filed: Jan. 16, 2002

Certificate of Correction issued Jul. 13, 2010

(21) Appl. No.: 95/000,561

(22) PCT Filed: Mar. 15, 2001

(86) PCT No.: PCT/GB01/01141
§ 371 (c)(1),
(2), (4) Date: Jan. 16, 2002

(87) PCT Pub. No.: WO01/77861
PCT Pub. Date: Oct. 18, 2001

(30) Foreign Application Priority Data

Apr. 6, 2000 (GB) .................................. 0008530.8

(51) Int. Cl.
*G06Q 90/00* (2006.01)
*G07F 17/32* (2006.01)
*A63F 3/00* (2006.01)

(52) U.S. Cl.
CPC ......... *G07F 17/3288* (2013.01); *A63F 3/00157* (2013.01)
USPC .................. 463/26; 463/25; 463/40; 463/42; 705/37

(58) Field of Classification Search
None
See application file for complete search history.

(56) References Cited

To view the complete listing of prior art documents cited during the proceeding for Reexamination Control Number 95/000,561, please refer to the USPTO's public Patent Application Information Retrieval (PAIR) system under the Display References tab.

*Primary Examiner* — Dennis Bonshock

(57) ABSTRACT

A betting exchange system receiving a plurality of bet requests backing a given outcome, each backing bet request specifying a price and a size at which an originator of the request is prepared to bet that the given outcome will occur. The betting exchange system receiving a plurality of bet requests laying the given outcome, each laying bet request specifying a price and a size at which an originator of the request is prepared to bet that the given outcome will not occur. The betting exchange system aggregating backing bet requests specifying the same price, aggregating laying bet requests specifying the same price, automatically matching a received backing bet request with individual or aggregated laying bet requests to complete a betting transaction, and automatically matching a received laying bet request with individual or aggregated backing bet requests to complete a betting transaction.

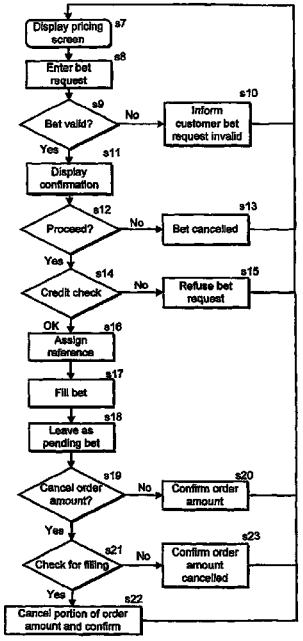

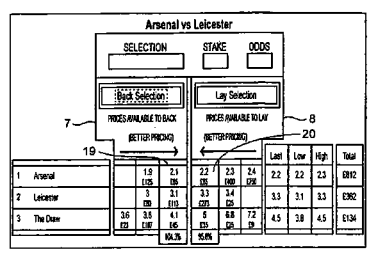

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

The patentability of claims 8-11 and 27-30 is confirmed.

Claims 1-7, 12-26 and 31-35 are cancelled.

* * * * *